United States Patent
Yuan et al.

(10) Patent No.: US 6,897,400 B1
(45) Date of Patent: May 24, 2005

(54) OUT FLUSHING GUIDE BUSHING

(75) Inventors: Renwei Yuan, Shanghai (CN); Michael Scott Lamphere, Hooksett, NH (US); Bin Wei, Mechanicville, NY (US); Andy Ji, Shanghai (CN)

(73) Assignee: General Electric Company, Niskayuna, NY (US)

( * ) Notice: Subject to any disclaimer, the term of this patent is extended or adjusted under 35 U.S.C. 154(b) by 5 days.

(21) Appl. No.: 10/801,304

(22) Filed: Mar. 16, 2004

(51) Int. Cl.[7] ............................. B23H 1/00; B23H 1/04
(52) U.S. Cl. .................................. 219/69.15; 219/69.14
(58) Field of Search ............................ 219/69.14, 69.15

(56) References Cited

U.S. PATENT DOCUMENTS

| | | | |
|---|---|---|---|
| 4,337,385 A | 6/1982 | Maropis et al. | |
| 4,717,804 A | 1/1988 | Tomalin | |
| 4,740,666 A | 4/1988 | Tomalin et al. | |
| 6,127,642 A * | 10/2000 | Gleason et al. | 219/69.15 |
| 6,184,486 B1 | 2/2001 | Diot et al. | |
| 6,326,576 B1 | 12/2001 | Krenz et al. | |
| 6,388,223 B2 | 5/2002 | Jones et al. | |
| 6,403,910 B1 | 6/2002 | Stang et al. | 219/69.15 |
| 2003/0029843 A1 | 2/2003 | Barbulescu | |

FOREIGN PATENT DOCUMENTS

| | | | |
|---|---|---|---|
| JP | 2-167623 A | * | 6/1990 |
| JP | 4-310322 A | * | 11/1992 |
| JP | 2001-38533 A | * | 2/2001 |

* cited by examiner

*Primary Examiner*—Geoffrey S. Evans
(74) *Attorney, Agent, or Firm*—Penny A. Clarke; Patrick K. Patnode

(57) ABSTRACT

A guide bushing for use in association with electrical discharge machining (EDM) apparatus including a rotatable electrode defining a longitudinal axis, is provided. The guide bushing includes a body portion defining a bore therethrough for receiving at least a portion of the electrode therein. The bore includes a proximal portion sized to be in contact with an outer surface of the electrode, an intermediate portion sized to be spaced from the electrode, and a distal portion sized to be at least partially in contact with the outer surface of the electrode.

36 Claims, 4 Drawing Sheets

OUT FLUSHING GUIDE BUSHING

BACKGROUND

The present invention relates to electrical discharge machining components and, more particularly, to novel arrangements and guide bushings to be used with electrical discharge machines for machining work pieces, such as aircraft engine parts, which have several features machined therein.

Electrical discharge machining (EDM) is a well known process for forming features, such as holes, slots and notches of various shapes and configurations, in an electrically conductive work piece. Conventional EDM systems typically employ an electrode including a tip which is advanced toward the work piece. Suitable energy is supplied to the electrode from a power supply to create an electrical potential between the work piece and the electrode in order to create a controlled spark which melts and/or vaporizes the work piece to form the desired feature. The work piece can be submerged in a bath of dielectric fluid which assists in the formation of the spark discharges, cools the work piece during repeated spark discharges and carries away material eroded from the work piece.

Typically, as seen in FIGS. 1 and 2, a conventional EDM system includes an electrode 100 defining a longitudinal central axis "X". Additionally, a bushing 104 can be provided near distal tip 108 of electrode 100. As seen in FIG. 2, bushing 104 defines a bore 110 extending therethrough which bore 110 is sized to permit passage of electrode 100 into, and through bore 110. Bore 110 includes a proximal portion 110a having a diameter substantially equal to the diameter of electrode 100 thereby defining a region of contact having a length "L1" (less than 10 mm) and a distal portion 110b having a diameter which is larger than the diameter of proximal portion 110a and electrode 100 thereby defining an annular flushing channel 112. In order to support the EDM process, fluid "F" (dielectric flushing fluid, e.g., de-ionized water) is injected and/or fed into flushing channel 112 by a feed channel 114. In this manner, during operation, fluid "F" can be injected along and towards distal portion 110b of electrode 110 to sweep and/or wash away debris.

It is known to rotate, or spin, electrode 100 around longitudinal axis "X" while performing the EDM process, such that electrode 100 will wear uniformly and thereby form a substantially straight hole. A concern with this type of process is that during machining, rotation "R" of electrode 100, in particular relatively high rates of rotation, results in electrode 100 bowing and/or flexing radially outward in the region proximate of bushing 104. The greater the rate of rotation of electrode 100 the greater the degree of deflection of distal portion 110b and the greater the deviation from linearity of rotating electrode 100 from an idle electrode 100. Since contact length "L1" acts like a pivot point about which distal portion 110b deflects the greater the degree of deflection of electrode 100 in the region proximal of bushing 104 the larger the deviation "Y1" which exists at the distal tip of electrode 100. Deviation "Y1" directly affects the geometry, accuracy and surface quality of the machined work piece.

Accordingly, the need exists for an improved out flushing guide bush capable of reducing the eccentricity of the electrode and which exhibits improved flushing performance.

BRIEF DESCRIPTION OF THE INVENTION

The present disclosure provides for improved guide bushings and systems for use in electrical or electro discharge machining.

According to one aspect of the present disclosure, a guide bushing is provided and includes a body portion having a bore extending therethrough. The bore includes a proximal portion having a diameter, an intermediate portion having a diameter which is larger than the diameter of the proximal portion, and a distal portion having a plurality of ribs extending radially inward therefrom and defining a plurality of channels therein which extend through to a distal-most end of the body portion. The guide bushing includes an inlet formed in the body portion and being in fluid communication with the intermediate portion of the bore.

According to another aspect of the present disclosure a guide bushing for use in association with electrical discharge machining (EDM) apparatus including a rotatable electrode defining a longitudinal axis, is provided. The guide bushing includes a body portion defining a bore therethrough for receiving at least a portion of the electrode therein. The bore includes a proximal portion sized to be in contact with an outer surface of the electrode, an intermediate portion sized to be spaced from the electrode, and a distal portion sized to be at least partially in contact with the outer surface of the electrode.

According to yet another aspect of the present disclosure, in a system for reducing the degree of deflection of a distal tip of a rotating electrode in an electrical discharge machining (EDM) apparatus including a guide bushing operatively associated with a distal end of the electrode, is provided. The improvement includes an auxiliary bushing operatively connected with the electrode. The auxiliary bushing includes a bore formed therein sized to permit rotation of the electrode relative to the auxiliary bushing, to permit slidable movement of the auxiliary bushing relative to the electrode in a direction along a longitudinal axis of the electrode, and to inhibit deflection of the electrode in a radially outward direction upon rotation of the electrode. The system further includes a support system operatively associated with the auxiliary bushing. The support system includes at least one arm connected to and extending from the auxiliary bushing, wherein the arm maintains the bore of the auxiliary bushing substantially co-axial with longitudinal axis of the electrode.

BRIEF DESCRIPTION OF THE DRAWINGS

The above features and advantages of the present invention will become apparent from a study of the following detailed description taken in conjunction with the accompanying drawings, in which like reference numerals refer to like elements throughout the several views, and in which.

DETAILED DESCRIPTION OF THE INVENTION

Figure 2:
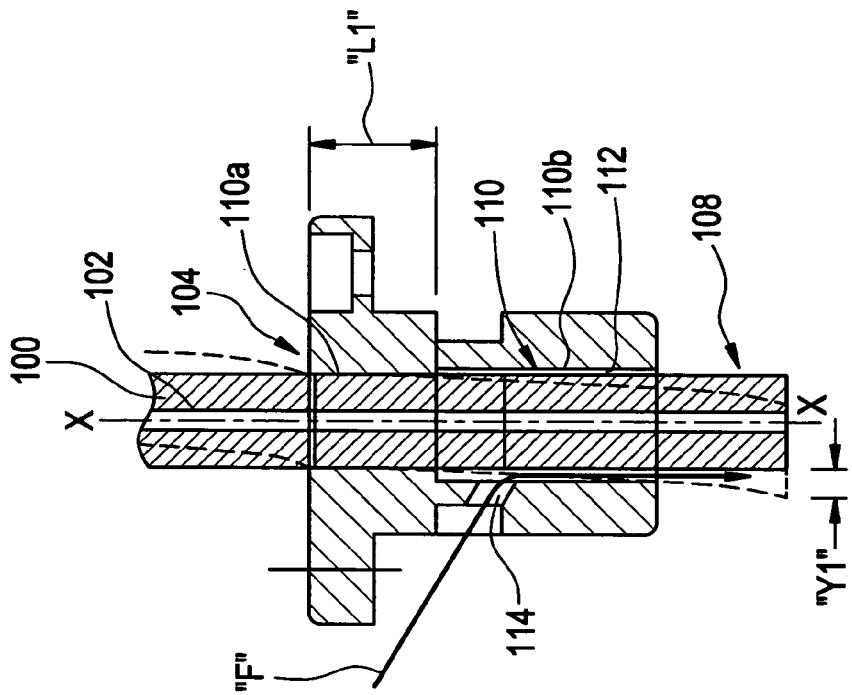
FIG. 2 is an enlarged cross-sectional side view of the area indicated as 2 of FIG. 1.
Figure 1:
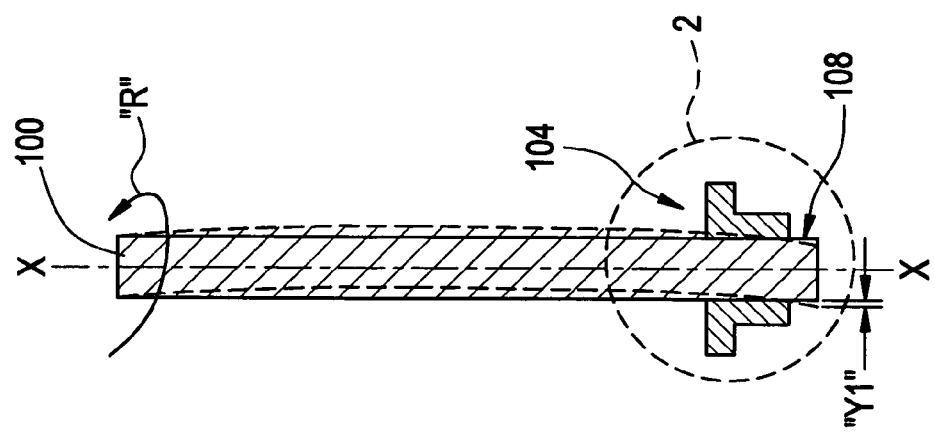
FIG. 1 is a longitudinal cross-sectional side view of an electrode including a prior art guide bushing operatively associated therewith.
Figure 4:
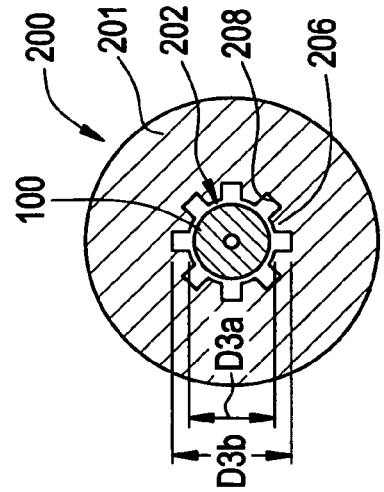
FIG. 4 is a transverse cross-sectional view as taken through 4—4 of FIG. 3.
Figure 3:
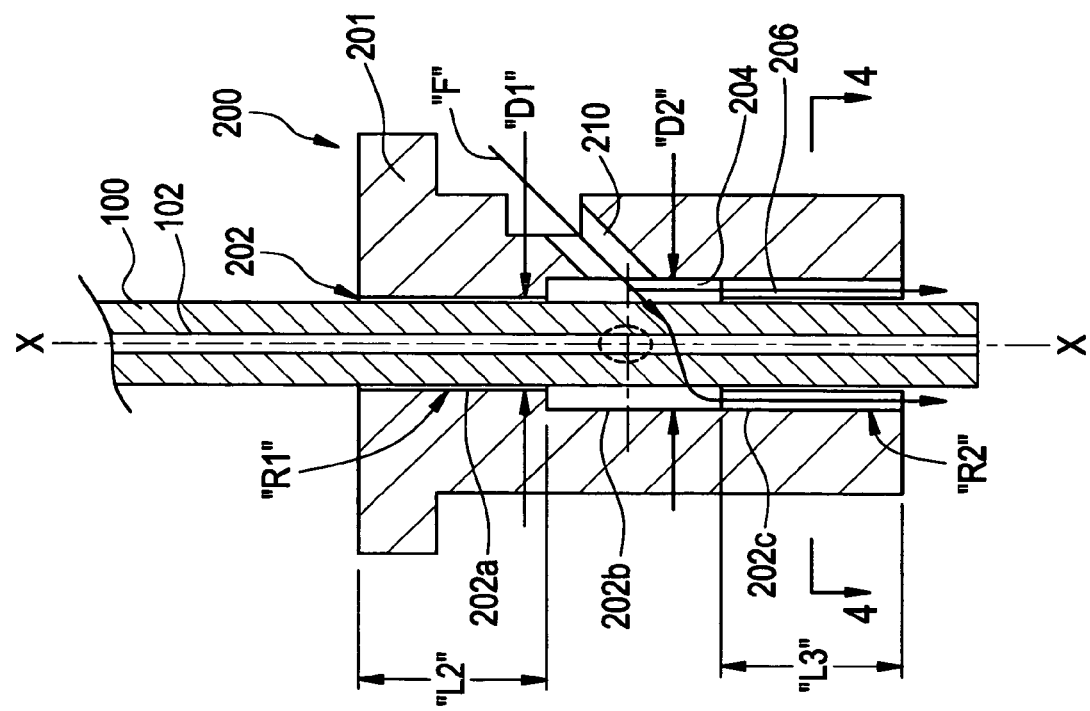
FIG. 3 is an enlarged longitudinal cross-sectional view of an electrode including a guide bushing according to the present disclosure operatively associated therewith.
Figure 5:
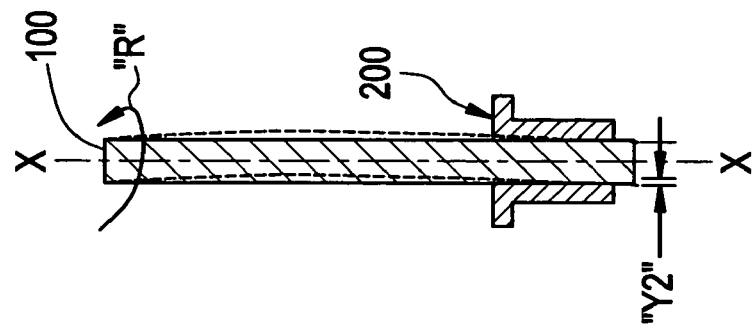
FIG. 5 is a longitudinal cross-sectional side view of an electrode including a guide bushing according to an alternate embodiment of the present disclosure, operatively associated with a distal end of the electrode.

Referring to the drawings wherein identical reference numerals denote the same elements throughout the various views, FIGS. 3–5 depict a guide bushing 200 for use with an electrical discharge machining (EDM) apparatus including an electrode 100 having a lumen 102 extending axially therethrough. While the following description is particularly directed to guide bushings for use with EDM processes and apparatus, it is envisioned and within the scope of the present disclosure that the guide bushings disclosed herein may be used in connection with other electro-erosion processes and/or apparatus. Guide bushing 200 includes a body portion defining a bore 202 extending completely therethrough. Bore 202 includes a proximal portion 202a, an intermediate portion 202b and a distal portion 202c.

In the drawings and in the description which follows, the term "proximal", as is traditional, will refer to the end of the instrument, device and/or apparatus which is closest to the operator while the term "distal" will refer to the end of the instrument, device and/or apparatus which is furthest away from the operator.

As best seen in FIG. 3, proximal portion 202a of bore 202 has a diameter "D1" substantially equal to the diameter of electrode 100. Proximal portion 202a of bore 202 defines a first contact region "R1" having a contact length "L2" which is larger than contact length "L1" of bushing 104. Intermediate portion 202b of bore 202 has a diameter "D2" which is larger than diameter "D1" of proximal portion 202a of bore 202 thereby defining an annular race 204. Distal portion 202c of bore 202 includes a plurality of ribs 206 extending radially inward therefrom. Preferably, ribs 206 are longitudinally oriented and define a series of channels 208 (see FIG. 4). Distal portion 202c of bore 202 has an inner diameter "D3a" which is substantially equal to the diameter of electrode 100 and an outer diameter "D3b" equal to the dimension of inner diameter "D3a" and the height of ribs 206. Outer diameter "D3b" defines the depth of channels 208. Ribs 206 define a second contact region "R2" having a contact length "L3".

While ribs 206 are preferably longitudinally oriented, it is envisioned that ribs 206 can be oriented in any number of configurations, including and not limited to helical, continuous, discontinuous, etc. In addition, while eight (8) ribs 206 defining eight channels 208 are shown, it is envisioned that any number of ribs 206 can be provided, preferably from 6 to 12 ribs 206.

The lengths of contact region "R1" and contact region "R2" are about one (1) to two (2) times greater than the diameter of electrode 100, however, the range and/or lengths of contact region "R1" and contact region "R2" may be longer than about one to two times the diameter of electrode 100. The diameter "D1" of proximal portion 202a of bore 202 may be about 0.01 mm to about 0.05 mm larger than the diameter of electrode 100. It is contemplated that diameter "D1" of proximal portion 202a of bore 202 may be chosen so that electrode 100 may slide freely along and/or through proximal portion 202a of bore 202, but not too loosely or sized beyond a predetermined tolerance. Diameter "D2" of intermediate portion 202b of bore 202 may be about one (1) to two (2) times greater than the diameter of electrode 100.

Guide bushing 200 further includes at least one inlet 210 extending through guide bushing 200 and into intermediate portion 202b. Inlet 210 functions to permit passage of fluid "F" into race 204 and out through channels 208.

In use, guide bushing 200 is positioned on electrode 100 such that distal portion 202c of bore 202 is oriented toward the work piece (not shown). As electrode 100 is rotated, fluid "F" (e.g., dielectric fluid, de-ionized water, etc.) is injected into intermediate portion 202b of guide bushing 200, flows around annular race 204 and is ejected and/or otherwise sprayed out the distal end of guide bushing 200 through channels 208. Guide bushing 200 essentially contacts electrode 100 at two locations, namely, along contact region "R1" and contact region "R2". Since the overall contact length between guide bushing 200 and electrode 100 is at least equal to contact length "L2" and contact length "L3", the tendency and/or ability of electrode 100 to bow and/or flex, as electrode 100 is rotated about longitudinal axis "X", is reduced and/or interfered with, e.g., the degree of eccentricity is reduced. Since guide bushing 200 is in contact with electrode 100 at both the distal-most end and the proximal-most end, the overall contact length of is equal to about 45 mm, i.e., the length of guide bushing 200. For example, as seen in FIG. 5, deviation "Y2" of the distal tip of electrode 100, having guide bushing 200 operatively associated therewith, is less than deviation "Y1" of the distal tip of electrode 100 having bushing 104 operatively associated therewith.

Guide bushing 200 stabilizes the machining process in such a manner so as to result in improved accuracy and surface quality of the work piece. In addition, channels 208 direct fluid "F" towards the work piece to promote the flushing efficiency of the system.

Preferably, guide bushing 200 is fabricated from a non-conductive material having a low coefficient of friction. For example, guide bushing 200 can be fabricated from nylon, polyester, polypropylene, Teflon®, neoprene, and the like or any combinations thereof. Teflon® is a registered trademark belonging to E.I. duPont de Nemours & Co., Inc. Preferred materials of fabrication for guide bushing 200 include, and are not limited to, electrically-non conductive and wear-resistant ceramics and engineered plastics.

Figure 6:
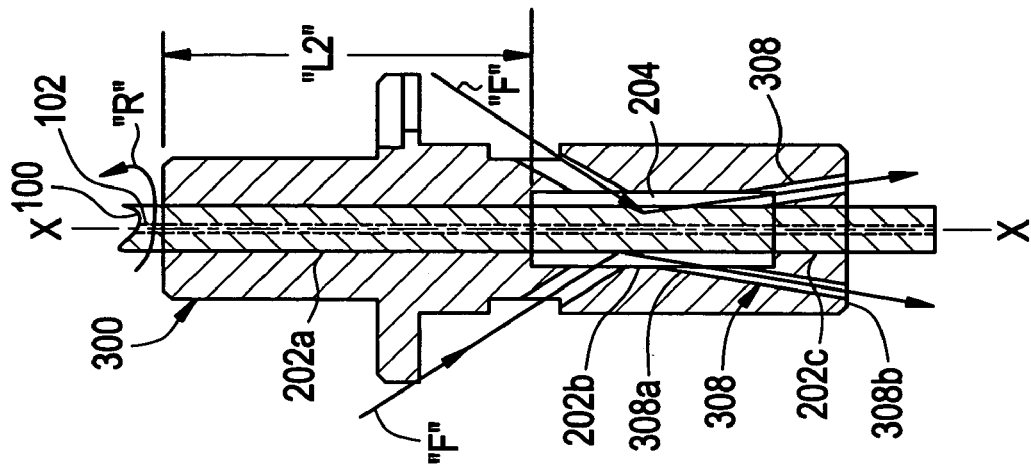
FIG. 6 is an enlarged cross-sectional side view of the area indicated as 6 of FIG. 5.

Turning now to FIG. 6, a guide bushing in accordance with another embodiment of the present disclosure is shown as 300. Guide bushing 300 is similar to guide bushing 200 and will only be discussed in detail to the extent necessary to identify differences in construction and operation.

Guide bushing 300 includes at least one, preferably a plurality of, channels 308 oriented in a direction radial to and transverse to longitudinal axis "X". In particular, each channel 308 includes a proximal end portion 308a in fluid communication with annular race 204 and a distal end portion 308b extending radially outward from longitudinal axis "X". As discussed above with respect to guide bushing 200 and channels 208, channels 308 of guide bushing 300 can be arranged in a helical pattern or the like to thereby create a vortex-like flow pattern emanating from the distal tip.

In this manner, during use, fluid "F" is injected into intermediate portion 202b of bushing 300, flows around annular race 204 and is sprayed out the distal end of bushing 300 through channels 308. Since each channel 308 is angled with respect to longitudinal axis "X", the direction of the flow of fluid "F" from the distal end of bushing 300 is also angled away from longitudinal axis "X".

Figure 7:
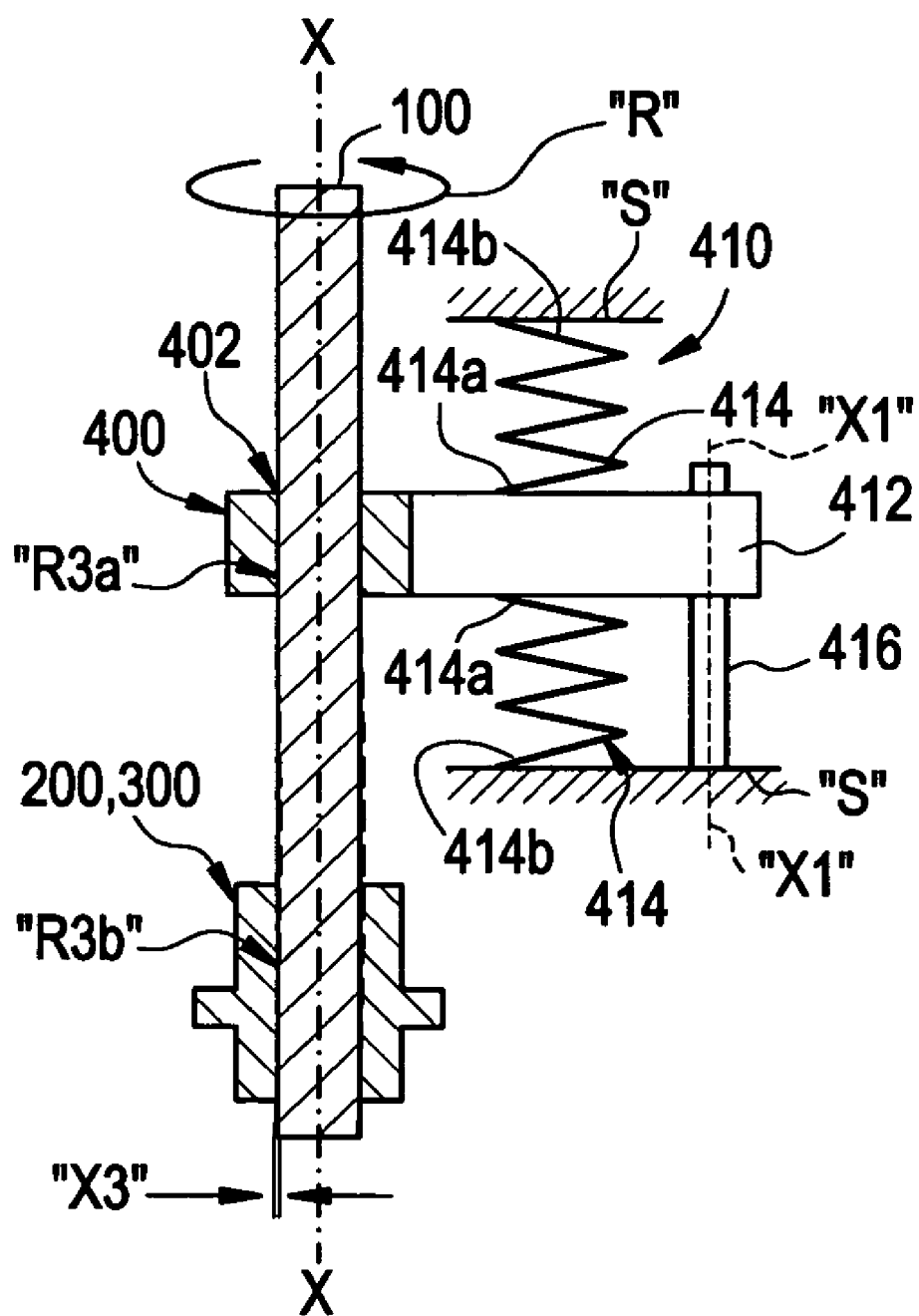
FIG. 7 is a longitudinal cross-sectional view of an electrode including a guide bushing according to the present disclosure and an auxiliary guide bushing operatively associated therewith.

Turning now to FIG. 7, in addition to positioning a guide bushing 200 or 300 on the distal end of electrode 100, an auxiliary bushing 400 is provided and is operatively associated with electrode 100. Preferably, auxiliary bushing 400 is positioned about electrode 100 at a location proximate guide bushing 200 or 300 and distal of a collet (not shown) used for connecting electrode 100 to the EDM apparatus. Most preferably, auxiliary bushing 400 is positioned at a location along the length of electrode 100 which exhibits the greatest degree of deflection from longitudinal axis "X".

Auxiliary bushing 400 defines a through-bore 402 having a diameter substantially equal to the diameter of electrode 100. Auxiliary bushing 400 is preferably fabricated from a non-conductive material having a low coefficient of friction, e.g., nylon, Teflon®, etc.

In use, auxiliary bushing 400 defines a first contact region "R3a" while guide bushing 200 or 300 defines a second contact region "R3b" made up of first and second contact regions "R1" and "R2" as described above (see FIG. 3). First contact region "R3a" combines with second contact region "R3b" to assist in maintaining the linearity of electrode 100 during the EDM process along longitudinal axis "X" and thus reduce the tendency of the distal end of electrode 100 to deviate from longitudinal axis "X". For example, as seen in FIG. 7, deviation "Y3" of the distal tip of electrode 100, having guide bushing 200/300 and auxiliary bushing 400 operatively associated therewith, is less than deviation "Y1" of the distal tip of electrode 100 having bushing 104 operatively associated therewith.

A support system 410, operatively associated with auxiliary bushing 400, is configured and adapted to position auxiliary bushing 400 relative to electrode 100. In particular, support system 410 includes at least one arm 412 connected to and extending from auxiliary bushing 400. Arm 412 functions to position and/or maintain bore 402 of auxiliary bushing 400 substantially co-axial with longitudinal axis "X". Support system 410 further includes at least one damping element 414 having a first end 414a operatively connected to bushing 400, preferably operatively connected to arm 412, and a second end 414b operatively connected to a support structure "S". Damping elements 414 can include, and are not limited to, springs, shocks, vibration dampers and the like.

Support system 410 can further include a guide rod 416 fixedly connected to support structure "S" having a longitudinal axis "X1" which is co-axial with the longitudinal axis "X" of electrode 100. Guide rod 416 preferably slidably extends through arm 412. Guide rod 416 functions to maintain auxiliary bushing 400, and particularly bore 402 of bushing 400, co-axially aligned with longitudinal axis "X".

A positioning system (not shown), operatively associated with auxiliary bushing 400, can also be provided. The positioning system would function to place and/or otherwise position auxiliary bushing 400 along the length of electrode 100, preferably at a location of maximum deflection (e.g., the mid-way point between guide bushing 200 or 300 and the drive structure (not shown) used to manipulate electrode 100). For example, the positioning system can include a rack and pinion type arrangement (not shown) or the like.

While the preferred forms and embodiments of the invention have been illustrated and described herein, it will be apparent to those of ordinary skill in the art that various changes and modifications may be made without deviating from the inventive concepts and spirit of the invention as set forth above, and it is intended by the appended claims to define all such concepts which come within the full scope and true spirit of the invention.

What is claimed is:

1. A guide bushing comprising:
   a body portion having a bore extending therethrough, the bore includes:
      a proximal portion having a diameter;
      an intermediate portion having a diameter which is larger than the diameter of the proximal portion; and
      a distal portion having a plurality of ribs extending radially inward therefrom and defining a plurality of channels therein which extend through to a distal-most end of the body portion; and
   an inlet formed in the body portion and being in fluid communication with the intermediate portion of the bore.

2. The guide bushing according to claim 1, wherein the distal portion of the bore has an inner diameter substantially equal to the diameter of the proximal portion of the bore and an outer diameter substantially equal to the inner diameter plus twice the height of the ribs.

3. The guide bushing according to claim 1, wherein the bore is sized to receive a rotatable electrode having a diameter therein.

4. The guide bushing according to claim 3, wherein the diameter of the proximal portion of the bore and the inner diameter of the distal portion of the bore are sized to be substantially equal to the diameter of the electrode.

5. The guide bushing according to claim 4, wherein the channels are axially aligned with a longitudinal axis of the bore.

6. The guide bushing according to claim 5, wherein the channels are angled in a direction radially outward.

7. The guide bushing according to claim 6, wherein the intermediate portion of the bore defines a race.

8. The guide bushing according to claim 7, wherein fluid enters the guide bushing and the race through the inlet and exits the guide bushing and the race through the channels.

9. The guide bushing according to claim 1, wherein the guide bushing is fabricated from a non-conductive material.

10. The guide bushing according to claim 1, wherein the guide bushing is fabricated from at least one of nylon, polytetrafluoroethylene, polypropylene, polyester and neoprene.

11. The guide bushing according to claim 1, wherein the guide bushing reduces the tendency of the electrode to bow radially outward upon rotation thereof.

12. The guide bushing according to claim 1, wherein the guide bushing tends to maintain the linearity of the electrode upon rotation of the electrode during a machining process.

13. A guide bushing for use in association with electrical discharge machining (EDM) apparatus including a rotatable electrode defining a longitudinal axis, the guide bushing comprising:
   a body portion defining a bore therethrough for receiving at least a portion of the electrode therein, the bore including:
      a proximal portion sized to be in contact with an outer surface of the electrode;
      an intermediate portion sized to be spaced from the electrode; and
      a distal portion sized to be at least partially in contact with the outer surface of the electrode, wherein the distal portion of the bore includes a plurality of radially oriented channels formed therein.

14. The guide bushing according to claim 13, wherein the guide bushing tends to maintain the linearity of the electrode upon rotation of the electrode during a machining process.

15. The guide bushing according to claim 13, wherein the channels are axially aligned with the longitudinal axis of the electrode.

16. The guide bushing according to claim 15, wherein the channels are angled with respect to the longitudinal axis of the electrode.

17. The guide bushing according to claim 15, wherein the intermediate portion of the bore defines a race within the guide bushing.

18. The guide bushing according to claim 17, further including an inlet formed in the body portion and being in fluid communication with the race.

19. The guide bushing according to claim 18, wherein fluid enters the guide bushing and the race through the inlet and exits the guide bushing through the channels.

20. The guide bushing according to claim 19, wherein the guide bushing defines a contact region which is substantially equal to the length of the bore.

21. The guide bushing according to claim 20, wherein between 6 and 12 channels are formed in the distal portion of the bore.

22. The guide bushing according to claim 13, wherein the proximal end portion of the bore defines a first contact region, and wherein the distal end portion of the bore defines a second contact region.

23. The guide bushing according to claim 13, wherein the guide bushing reduces the tendency of the electrode to bow radially outward upon rotation thereof.

24. In a system for reducing the degree of deflection of a distal tip of a rotating electrode in an electrical discharge machining (EDM) apparatus including a guide bushing operatively associated with a distal end of the electrode, the improvement comprising:

an auxiliary bushing operatively connected with the electrode, the auxiliary bushing including a bore formed therein sized to permit rotation of the electrode relative to the auxiliary bushing, to permit slidable movement of the auxiliary bushing relative to the electrode in a direction along a longitudinal axis of the electrode, and to inhibit deflection of the electrode in a radially outward direction upon rotation of the electrode, wherein the auxiliary bushing is positioned proximal of the guide bushing;

a support system operatively associated with the auxiliary bushing, the support system including at least one arm connected to and extending from the auxiliary bushing, the arm maintaining the bore of the auxiliary bushing substantially co-axial with longitudinal axis of the electrode, wherein the guide bushing comprises:

a body portion defining a bore therethrough for receiving at least a portion of the electrode therein, the bore including:

a proximal portion sized to be in contact with an outer surface of the electrode;

an intermediate portion sized to be spaced from the electrode; and a distal portion sized to be at least partially in contact with the outer surface of the electrode.

25. The system according to claim 24, wherein the auxiliary bushing and the guide bushing reduce the tendency of the electrode to bow radially outward upon rotation thereof.

26. The system according to claim 24, wherein the auxiliary bushing and the guide bushing tend to maintain the linearity of the electrode upon rotation of the electrode during a machining process.

27. The system according to claim 24, further comprising at least one damping element having a first end operatively connected to the auxiliary bushing and a second end operatively connected to a support structure.

28. The system according to claim 27, wherein the damping element includes at least one of a spring and a damper.

29. The system according to claim 28, wherein the support structure includes a guide rod having a longitudinal axis which is aligned parallel to the longitudinal axis of the electrode, wherein the arm is slidably supported by the guide rod.

30. The system according to claim 24, wherein the distal portion of the bore of the guide bushing includes a plurality of radially oriented channels formed therein.

31. The system according to claim 30, wherein the channels are axially aligned with the longitudinal axis of the electrode.

32. The system according to claim 31, wherein the intermediate portion of the bore of the guide bushing defines a race within the guide bushing.

33. The system according to claim 32, wherein the guide bushing further includes an inlet formed in the body portion and which is in fluid communication with the race.

34. The system according to claim 33, wherein fluid enters the guide bushing and the race through the inlet and exits the guide bushing through the channels.

35. The system according to claim 34, wherein the guide bushing defines a contact region which is substantially equal to the length of the bore thereof.

36. The system according to claim 35, wherein the proximal end portion of the bore of the guide bushing defines a first contact region, and wherein the distal end portion of the bore of the guide bushing defines a second contact region.

* * * * *